Nov. 27, 1956  H. B. FUGE  2,771,973
ELECTRIC CLUTCH-BRAKE MOTORS
Filed May 1, 1952  2 Sheets-Sheet 1

WITNESS:
William Martin

INVENTOR.
Harry B. Fuge
BY
William P. Stewart
ATTORNEY

Nov. 27, 1956  H. B. FUGE  2,771,973
ELECTRIC CLUTCH-BRAKE MOTORS
Filed May 1, 1952  2 Sheets-Sheet 2

WITNESS:
William Martins

INVENTOR.
Harry B. Fuge
BY
William P. Stewart
ATTORNEY

United States Patent Office 2,771,973
Patented Nov. 27, 1956

2,771,973

ELECTRIC CLUTCH-BRAKE MOTORS

Harry B. Fuge, Somerville, N. J., assignor to The Singer Manufacturing Company, Elizabeth, N. J., a corporation of New Jersey Application May 1, 1952, Serial No. 285,492

5 Claims. (Cl. 192—18)

This invention relates to electric clutch-brake motors or power transmitters for driving industrial type sewing machines and more particularly to a clutch and brake mechanism for such motors.

An object of this invention is to provide a clutch and brake adjusting device for transmitters which will simultaneously adjust both the clutch and the brake to the correct clearances.

Another object of the invention is to provide a transmitter with a clutch and brake mechanism which is readily assembled and adjusted.

Further objects of the invention will be readily apparent when the following description is considered in connection with the accompanying drawings.

Figure 1:
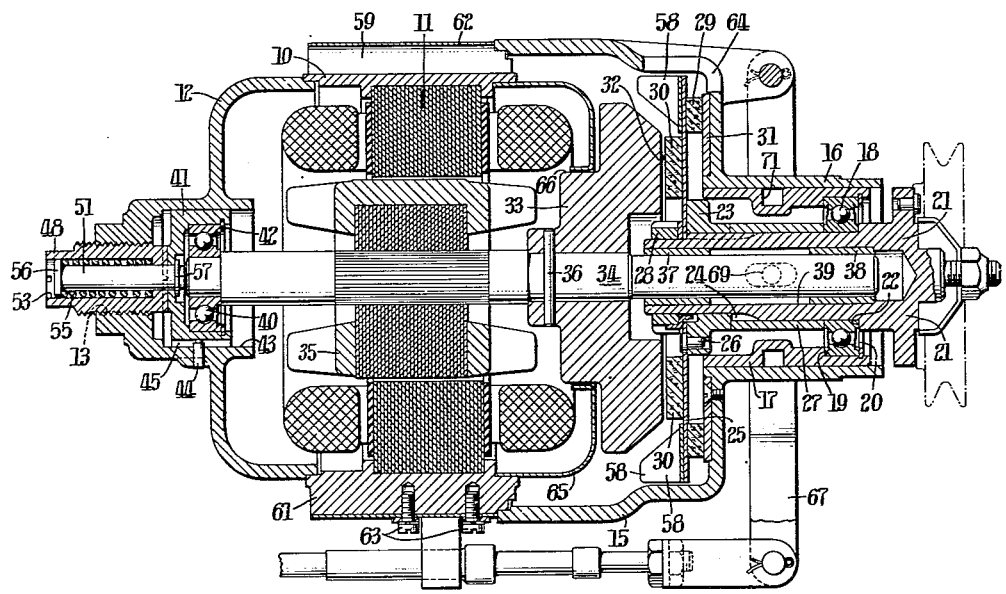
Fig. 1 is a longitudinal sectional view taken substantially through the center of an electric clutch-brake motor embodying the invention.
Figures 2, 3, 4:
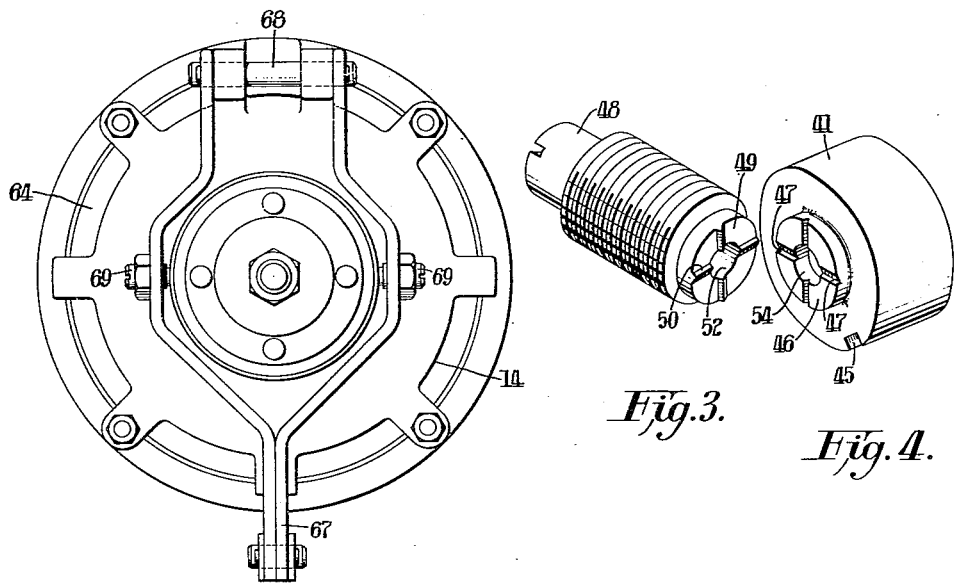
Fig. 2 is a right end view of the clutch-brake motor as shown in Fig. 1.
Fig. 3 is a perspective view of the clutch and brake adjusting plug of the adjusting device.
Fig. 4 is a perspective view of the bearing cup of the adjusting device.
Figure 5:
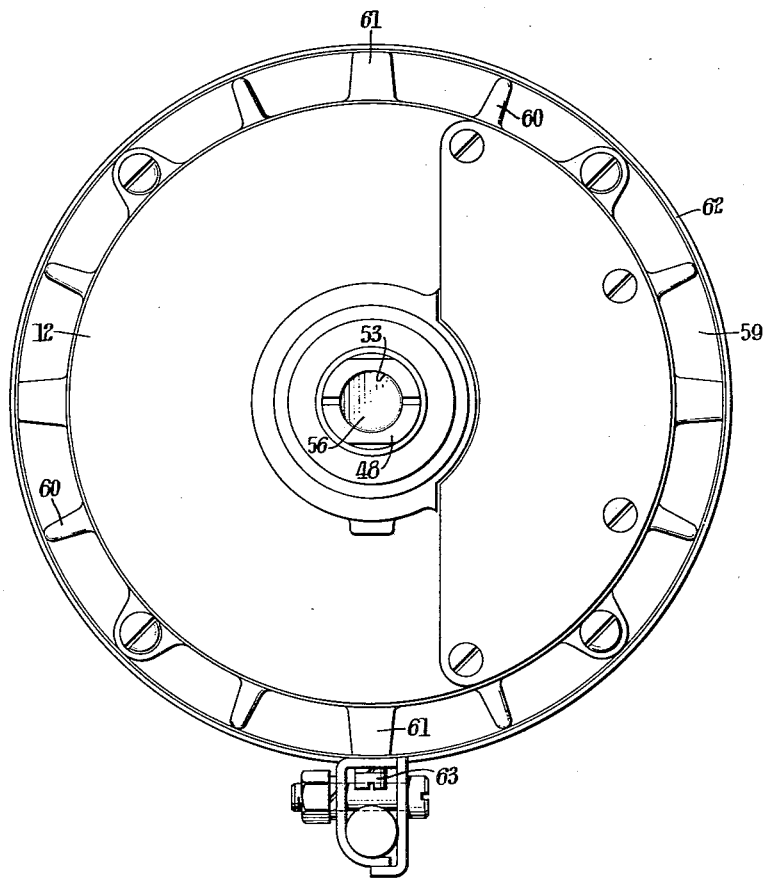
Fig. 5 is a left end view of the clutch-brake motor as shown in Fig. 1.

In the drawings, I have shown an electric clutch-brake driving device or transmitter comprising a stator housing 10 carrying a stator 11. One end of the stator housing 10 is closed by an end bell 12 provided with screw threads formed in the wall of a central opening 13. The other end of the stator housing 10 carries a spider 14 provided with a plurality of supporting legs 15. A tubular support member 16 extends outwardly from the center of the spider 14 and carries a slidable actuating sleeve 17. The outer race of an anti-friction bearing 18 is held in place against a shoulder 19 formed in the sleeve 17 by a snap ring 20. A driven shaft 21 is journaled in the bearing 18 and is provided with a shoulder 22 against which the inner race of the bearing 18 is positioned. A hub 23 is mounted on splines 24 formed on one end of the driven shaft 21 and carries a disc 25 which is held against rotation relative to the hub 23 by a locating pin 26 pressed into the hub 23. The hub 23 and disc 25 are securely held in place against a spacing sleeve 27 disposed between the hub 23 and the bearing 18 by a nut 28 threaded on the end of the driven shaft 21. The disc carries a friction brake element or facing 29 on one side and a friction clutch element or facing 30 on the other side. The brake facing 29 can be engaged with a brake element 31 carried by the spider 14 concentric with the driven shaft 21.

Under normal operating conditions, when it is desired to rotate the driven shaft 21, the clutch facing 30 can be engaged with a driving clutch element 32 formed on a flywheel 33 carried on a rotatable rotor shaft 34. The rotor shaft carries a motor rotor 35 and is fastened to the flywheel 33 by a pin 36. One end of the rotor shaft 34 is journaled in two sleeve bearings 37 and 38 pressed into a bore 39 in the driven shaft 21. The sleeve bearings permit both relative rotary and axial motion of the rotor shaft 34 and the driven shaft 21. The other end of the driven shaft 21 is press fitted into the inner race of an anti-friction control bearing 40. The outer race of the control bearing 40 is fitted into a bearing cup 41 and held in place by a snap ring 42. A counterbore 43 formed in the end bell 12 coaxial with the threaded opening 13 slidably supports the bearing cup 41. A pin 44 inserted through a wall of the counterbore 43 enters a longitudinal slot 45 formed in the cylindrical outer wall of the bearing cup 41 to prevent rotation of the cup 41. The bottom of the bearing cup is provided with a flat surface 46 broken by four radial V-shaped grooves 47.

Adjustment of the device is accomplished by means of an adjusting plug 48 which is threaded into the threaded opening 13. The inner end of the plug 48 is also formed with a flat surface 49 broken by four radial V-shaped ridges 50 which are adapted to enter the grooves 47 in the bearing cup 41. The outer end of the plug 48 is slotted to receive a screw-driver blade or similar tool (not shown). A connecting pin 51 passes through a central opening 52 and a deep counterbore 53 formed in the plug 48 and also passes through a central aperture 54 in the bottom of the bearing cup 41. A coil compression spring 55 is interposed between the bottom of the counterbore 53 and a head 56 formed on the pin 51. A snap ring 57 engaging the connecting pin 51 prevents the other end of the connecting pin 51 from being withdrawn through the aperture 54 in the bearing cup 41.

Ventilation for the device is provided by a series of fan blades 58 carried by the disc 25 near its periphery. Air passages 59 over the stator housing 10 are formed by a series of spacing ribs 60 and 61 which support a cylindrical shroud 62 surrounding the stator housing 10. The shroud is secured to the housing by screws 63. Upon rotation of the driven shaft 21 and the disc 25, air is drawn through the air passages 59 and expelled through openings 64 between the legs 15 of the spider 14 by the fan blades 58. A shield 65 carried by the housing 10 fits closely around a peripheral surface 66 on the flywheel 33 to prevent dirt from entering the motor portion of the device and collecting around the rotor 35 and stator 11. A similar transmitter ventilating structure is disclosed and claimed in the copending U. S. patent application of R. D. Ingalls, Serial No. 285,411, filed on May 1, 1952, now Patent No. 2,739,251.

Axial motion of the sleeve 17 is effected by moving an operating lever 67. The lever 67 is pivotally mounted on a pivot pin 68 carried by the spider 14. Shifting pins 69 carried by the lever 67 extend through the support 16 and enter a circumferential groove 70 formed in the sleeve 17. Motion of the lever 67 about the pivot pin 68 will, therefore, move the sleeve 17 axially.

In view of the above description, it is believed that the operation and advantages of my invention will now be readily understood. In previous clutch-brake motors of this type, it has always been difficult to obtain smooth, quiet operation of the clutch and brake mechanism. Frequently the noise and vibration in these motors is caused by poor adjustment of the clutch and brake clearance and by misalignment of the friction clutch surfaces. In the present device, the clutch and brake clearance can be readily set correctly and the friction surfaces are always in proper alignment. As shown in the drawings, the rotor shaft 34 is concentrically journaled within the driven shaft 21 which is in turn carried concentrically by the slidable sleeve 17. The driving clutch element 32 is also carried by the rotor shaft 34. In manufacturing and assembling these elements, the concentricity of the clutch elements 30 and 32 can be readily maintained within permissible limits since the flywheel 33 and the disc 25 are axially aligned by the rotor shaft 34.

The clutch and brake adjusting device is located at the other end of the housing 10 from the clutch and brake mechanism where it is readily accessible without interference from other parts, such as the lever 67. When the clutch and brake are properly adjusted, there should be sufficient clearance between the friction elements that either the clutch elements or the brake elements can be engaged while the other elements are completely disengaged. Further, the clearance must not be so great that there is an undue time lag between the disengagement of one pair of elements and the engagement of the other pair of elements. The clutch and brake clearance are adjusted by turning the adjusting plug 48. As the plug 48 is turned, the ridges 50 will ride over the flat surface 46 of the bearing cup 41 until they enter the grooves 47 at the end of each 90 degrees of rotation. The ridges 50 and grooves 47 are yieldingly held in engagement by the spring 55 and pin 51 and function as a detent device to hold the adjusting plug 48 in position at the end of each 90 degrees of rotation. As the plug 48 is turned to move inwardly, it forces the bearing cup 41 supporting the end of the rotor shaft 34 to move to the right as viewed in Fig. 1. The bearing cup 41 carries the rotor shaft 34, and hence the driving clutch element 32, with it in its motion. Obviously, the clutch element 32 will eventually be pressed into engagement with the friction facing 30 and, since the disc 25 and driven shaft 21 are axially movable, the brake facing 29 will also be forced into engagement with the brake element 31. Of course, under these conditions the entire mechanism would not operate or, if the friction elements did slip, excessive wear and seizing of the elements would result. However, with my device, these conditions cannot accidentally be obtained and unknowingly be allowed to remain. Assuming that the plug 48 has been turned to a position where the ridges 50 and the grooves 47 are in engagement and the total clearance between the clutch and the brake elements is less than the height of the ridges 50 plus the distance the plug 48 moves axially in 90 degrees of rotation, the plug 48 cannot be turned an additional 90 degrees to permit the ridges 50 and grooves 47 to re-engage before the clutch and brake elements are forced into firm engagement. Thus, when a mechanic adjusts the clutch and brake clearance to this point of no clearance, to obtain the correct adjustment it is only necessary to turn the plug 48 in the opposite direction until the ridges 50 and grooves 47 re-engage. When the plug 48 is adjusted to a position where the ridges 50 and grooves 47 engage for the last time before the clutch and brake elements are forced into engagement, the clearance between the friction elements is correct.

It should be noted that when the parts are first assembled and the friction facings 29 and 30 are new, the rotor 35 and stator 11 are slightly misaligned, as shown in Fig. 1. However, as the friction facings 29 and 30 wear and the shaft 34 is moved axially to adjust the clutch and brake clearance, the rotor 35 and stator 11 will gradually be brought into alignment. The small amount of misalignment does not affect the operation of the motor. Of course, it is evident that the greater the number of radial ridges 50 and grooves 47, the more accurate the adjustment of the clutch and brake clearance will be. Further, the desired total clearance is governed by the height of the ridges 50. The smaller the height of the ridges 50, the smaller the clearance will be between the friction surfaces.

From the above description, it will be readily understood that I have provided a clutch-brake motor with a clutch and brake construction which is always maintained in alignment and, further, I have provided an adjusting device for the clutch and brake which permits quick and accurate adjustment of the clearance between the clutch and the brake friction surfaces.

Having thus set forth the nature of the invention, what I claim herein is:

1. An electric clutch-brake motor comprising a casing, a motor stator and a brake element carried by said casing, a driven shaft carried by said casing, a rotor shaft having one end journaled in said driven shaft, a driving clutch element carried by said rotor shaft, a driven disc disposed between said elements, an adjusting member threaded into said casing, a cup member slidably mounted in said casing and rotatably supporting said rotor shaft, one of said members having a notched surface and the other of said members having a ridged surface, and a yieldable connection including a spring holding said surfaces yieldingly in engagement.

2. An electric clutch-brake motor comprising a casing, a brake element carried by said casing, a rotor shaft having one end rotatably and slidably supported by said casing, a driving clutch element carried by said shaft, a driven disc disposed between said elements, an adjusting plug threaded into said casing and having a ridged surface, means for moving said shaft axially including a bearing cup having a notched surface, and a yieldable connection between said cup and said plug for holding said surfaces yieldingly in engagement.

3. An electric clutch-brake motor comprising a casing, a motor stator and a friction element carried by said casing, a rotor shaft having one end carried by said casing, a friction element carried by said shaft, an adjusting member threaded into said casing, means for moving said shaft axially including a bearing cup member operatively supporting the other end of said shaft, one of said members having a ridged surface and the other of said members having a notched surface, and a yieldable connection between said members holding said surfaces yieldingly in engagement.

4. An electric clutch-brake motor comprising a casing, a motor stator and a friction element carried by said casing, a rotor shaft having one end supported by said casing, a driving clutch element carried by said shaft, an adjusting member threaded into said casing, a bearing cup member carried by said casing and operatively supporting the other end of said rotor shaft, one of said members having a grooved surface and the other of said members having a ridged surface, a headed pin connecting said two members together, and a spring interposed between one end of said pin and one of said members.

5. An electric clutch-brake motor comprising a casing, a motor stator and a brake element carried by said casing, an axially movable and rotatable driven shaft carried by said casing, a rotor shaft having one end journaled in said driven shaft, a motor rotor and a driving clutch member carried by said rotor shaft, a bearing cup member carried by said casing and rotatably supporting the other end of said rotor shaft, an adjusting member threaded into said casing, said members having notched and ridged coacting surfaces, a headed pin connecting said two members together, and a coil spring interposed between one end of said pin and one of said members.

References Cited in the file of this patent
UNITED STATES PATENTS

| 1,438,361 | Coleman | Dec. 12, 1922 |
| 1,652,492 | Naul | Dec. 13, 1927 |
| 2,387,418 | Sundt | Oct. 23, 1945 |

FOREIGN PATENTS

| 206,564 | Great Britain | Nov. 5, 1923 |
| 549,605 | Great Britain | Nov. 30, 1942 |